United States Patent
Ni et al.

(10) Patent No.: US 10,891,957 B2
(45) Date of Patent: Jan. 12, 2021

(54) MULTI-USER VIRTUAL ASSISTANT FOR VERBAL DEVICE CONTROL

(71) Applicant: Google LLC, Mountain View, CA (US)

(72) Inventors: Yuzhao Ni, Sunnyvale, CA (US); David Roy Schairer, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/594,807

(22) Filed: Oct. 7, 2019

(65) Prior Publication Data

US 2020/0035239 A1    Jan. 30, 2020

Related U.S. Application Data

(63) Continuation of application No. 15/481,948, filed on Apr. 7, 2017, now Pat. No. 10,438,584.

(51) Int. Cl.
    *G10L 15/00*      (2013.01)
    *G10L 15/22*      (2006.01)
    (Continued)

(52) U.S. Cl.
    CPC .............. *G10L 15/22* (2013.01); *G06F 21/32* (2013.01); *G10L 15/08* (2013.01); *G10L 17/22* (2013.01);
    (Continued)

(58) Field of Classification Search
None
See application file for complete search history.

(56) References Cited

U.S. PATENT DOCUMENTS 7,590,536 B2    9/2009    Bates et al.
9,189,196 B2    11/2015    Doherty et al.
(Continued)

FOREIGN PATENT DOCUMENTS

CN    105431813    3/2016
CN    106506442    3/2017
(Continued)

OTHER PUBLICATIONS

International Search Report and Written Opinion of PCT Ser. No. PCT/US2018/025302; 10 pages dated Jun. 13, 2018.
(Continued)

*Primary Examiner* — Edgar X Guerra-Erazo
(74) *Attorney, Agent, or Firm* — Middleton Reutlinger

(57) ABSTRACT

In one example, a method includes receiving audio data generated by one or more microphones of a computing device, the audio data representing a spoken utterance; identifying, based on the audio data, a user that provided the spoken utterance; identifying, based on the audio data, an automation action associated with one or more automation devices, the automation action corresponding to the spoken utterance; determining whether the identified user is authorized to cause performance of the identified automation action; and responsive to determining that the identified user is authorized to cause performance of the identified automation action, causing the one or more automation devices to perform the identified automation action.

20 Claims, 5 Drawing Sheets

(51) Int. Cl.
  *G10L 15/08* (2006.01)
  *G10L 17/22* (2013.01)
  *G06F 21/32* (2013.01)
  *H04L 29/06* (2006.01)

(52) U.S. Cl.
  CPC ........ *H04L 63/0861* (2013.01); *H04L 63/102* (2013.01); *G10L 2015/088* (2013.01); *G10L 2015/223* (2013.01)

(56) References Cited

U.S. PATENT DOCUMENTS

| | | | |
|---|---|---|---|
| 9,401,058 | B2 * | 7/2016 | De La Fuente .......... G07C 9/37 |
| 10,748,546 | B2 * | 8/2020 | Kim ........................ G10L 15/22 |
| 2007/0216764 | A1 | 9/2007 | Kwak |
| 2013/0195285 | A1 * | 8/2013 | De La Fuente .......... G07C 9/37 381/92 |
| 2013/0311997 | A1 | 11/2013 | Gruber et al. |
| 2014/0100848 | A1 | 4/2014 | Shaffer et al. |
| 2015/0170643 | A1 | 6/2015 | Nicholson et al. |
| 2016/0125879 | A1 | 5/2016 | Lovitt |
| 2016/0248768 | A1 | 8/2016 | McLaren et al. |
| 2016/0262017 | A1 | 9/2016 | Lavee et al. |
| 2018/0074785 | A1 | 3/2018 | Ohmura |
| 2019/0235831 | A1 * | 8/2019 | Bao ......................... G10L 15/18 |

FOREIGN PATENT DOCUMENTS

| | | |
|---|---|---|
| WO | 2015196063 | 12/2015 |
| WO | 2016007332 | 1/2016 |

OTHER PUBLICATIONS

Newman, "Why Amazon Echo and Google Home Can't Tell Who's Talking-Yet," retrieved from https://www.fastcompany.com/3068762/why-amazon-echo-and-google-home-cant-tell-whos-talking, Mar. 7, 2017, 33 pp.

Amazon, "Household Profiles on Alexa Devices," retrieved from https://www.amazon.com/gp/help/customer/display.html?nodeId=201628040, Feb. 28, 2017, 2 pp.

Eadicicco, "Exclusive: Amazon Developing Advanced Voice-Recognition for Alex," retrieved from http://time.com/4683981/amazon-echo-voice-id-feature-2017/, Feb. 27, 2017, 3 pp.

Gartenberg, "Amazon Reportedly Working to Get Alexa to Distinguish Between Different Voices," retrieved from http://www.theverge.com/circuitbreaker/2017/2/27/14753276/amazon-alexa-individual-voice-recognition-voice-id, Feb. 27, 2017, 2 pp.

Fitzpatrick, "How to Share HomeKit Access with Family, Roommates, and Guests," retrieved from https://howtogeek.com/244255/how-to-share-homekit-access-with-family-roommates-and-guests/, Oct. 5, 2016, 7 pp.

Sensory Inc., "Sensory Releases Embedded Speaker Verification SDK—Enables Devices to Switch User Profiles Based on Who's Talking," retrieved from http://www.sensory.com/sensory-releases-embedded-speaker-verification-sdk-enables-devices-to-switch-user-profiles-based-on-whos-talking/, Jun. 30, 2015, 3 pp.

Popper et al., "Google Home's Biggest Challenge will be Handling Accounts for the Whole Family—The Verge," retrieved from http://www.theverge.com/2016/10/4/13164298/google-homes-multiple-user-accounts, Oct. 4, 2016, 3 pp.

China National Intellectual Property Administration; Notification of First Office Action issue in Application No. 201880029263.1; 28 pages; dated Aug. 21, 2020.

European Patent Office: Intention to Grant issued in Application No. 18720449.0 dated Nov. 10, 2020.

\* cited by examiner

MULTI-USER VIRTUAL ASSISTANT FOR VERBAL DEVICE CONTROL

BACKGROUND

Some computing platforms may provide a user interface from which a user can chat, speak, or otherwise communicate with a virtual, computational assistant (e.g., also referred to as "an intelligent assistant" or simply as an "assistant") to cause the assistant to output useful information, respond to a user's needs, or otherwise perform certain operations to help the user complete a variety of real-world or virtual tasks. For instance, some assistants may trigger automation devices to perform automation actions to satisfy user requests. Unfortunately, such assistants may fail to distinguish between different users and may trigger performance of automation actions without regard for the identity of the user that provided the request.

SUMMARY

In general, techniques of this disclosure may enable virtual, computational assistants (e.g., also referred to as "intelligent assistants" or simply as "assistants"), to selectively cause automation devices to perform automation actions, that satisfy a spoken or verbal user request, based on an identity and associated access rights (e.g., permissions, authorizations, etc.) of the requesting user. For instance, a computing device may receive, with a microphone, acoustic input (e.g., audio data) that corresponds to a user utterance. Based on the acoustic input, the computing device may identify the user that provided the spoken utterance and identify an automation action to satisfy the utterance (e.g., using speech recognition). If the user has access rights to cause performance of the identified automation action, the computing device may initiate performance of the automation action (i.e., cause one or more automation devices to perform the automation action). Similarly, if the user does not have access rights to cause performance of the identified automation action, the computing device may refrain from initiating performance of the automation action. In this way, the assistant may prevent users from triggering automation actions for-which they are not authorized. As such, the assistant may improve the security of the spoken or verbal triggering of automation actions.

In one example, a method includes receiving audio data generated by one or more microphones of a computing device, the audio data representing a spoken utterance; identifying, based on the audio data, a user that provided the spoken utterance; identifying, by one or more processors and based on the audio data, an automation action associated with one or more automation devices, the automation action corresponding to the spoken utterance; determining, by the one or more processors, whether the identified user is authorized to cause performance of the identified automation action; and responsive to determining that the identified user is authorized to cause performance of the identified automation action, causing, by the one or more processors, the one or more automation devices to perform the identified automation action.

In another example, a computing system includes a communications module; at least one processor; and at least one memory. In this example, the at least one memory comprises instructions that when executed, cause the at least one processor to provide an assistant configured to: receive, via the communications module, audio data generated by one or more microphones of a computing device, the audio data representing a spoken utterance; obtain an identification of a user that provided the spoken utterance, the identification determined based on the audio data; identify, based on the audio data, an automation action associated with one or more automation devices, the automation action corresponding to the spoken utterance; determine whether the identified user is authorized to cause performance of the identified automation action; and in response to determining that the identified user is authorized to cause performance of the identified automation action, cause the one or more automation devices to perform the identified automation action.

In another example, a computer-readable storage medium stores instructions that, when executed, cause at least one processor of a computing system to: receive audio data generated by one or more microphones of a computing device, the audio data representing a spoken utterance; obtain an identification of a user that provided the spoken utterance, the identification determined based on the audio data; identify, based on the audio data, an automation action associated with one or more automation devices, the automation action corresponding to the spoken utterance; determine whether the identified user is authorized to cause performance of the identified automation action; and in response to determining that the identified user is authorized to cause performance of the identified automation action, cause the one or more automation devices to perform the identified automation action.

In another example, a computing system or computing device comprises means for receiving audio data generated by one or more microphones of the computing device, the audio data representing a spoken utterance; means for identifying, based on the audio data, a user that provided the spoken utterance; means for identifying, based on the audio data, an automation action associated with one or more automation devices, the automation action corresponding to the spoken utterance; means for determining whether the identified user is authorized to cause performance of the identified automation action; and means for causing, responsive to determining that the identified user is authorized to cause performance of the identified automation action, the one or more automation devices to perform the identified automation action.

The details of one or more examples are set forth in the accompanying drawings and the description below. Other features, objects, and advantages of the disclosure will be apparent from the description and drawings, and from the claims.

DETAILED DESCRIPTION

Figure 1:
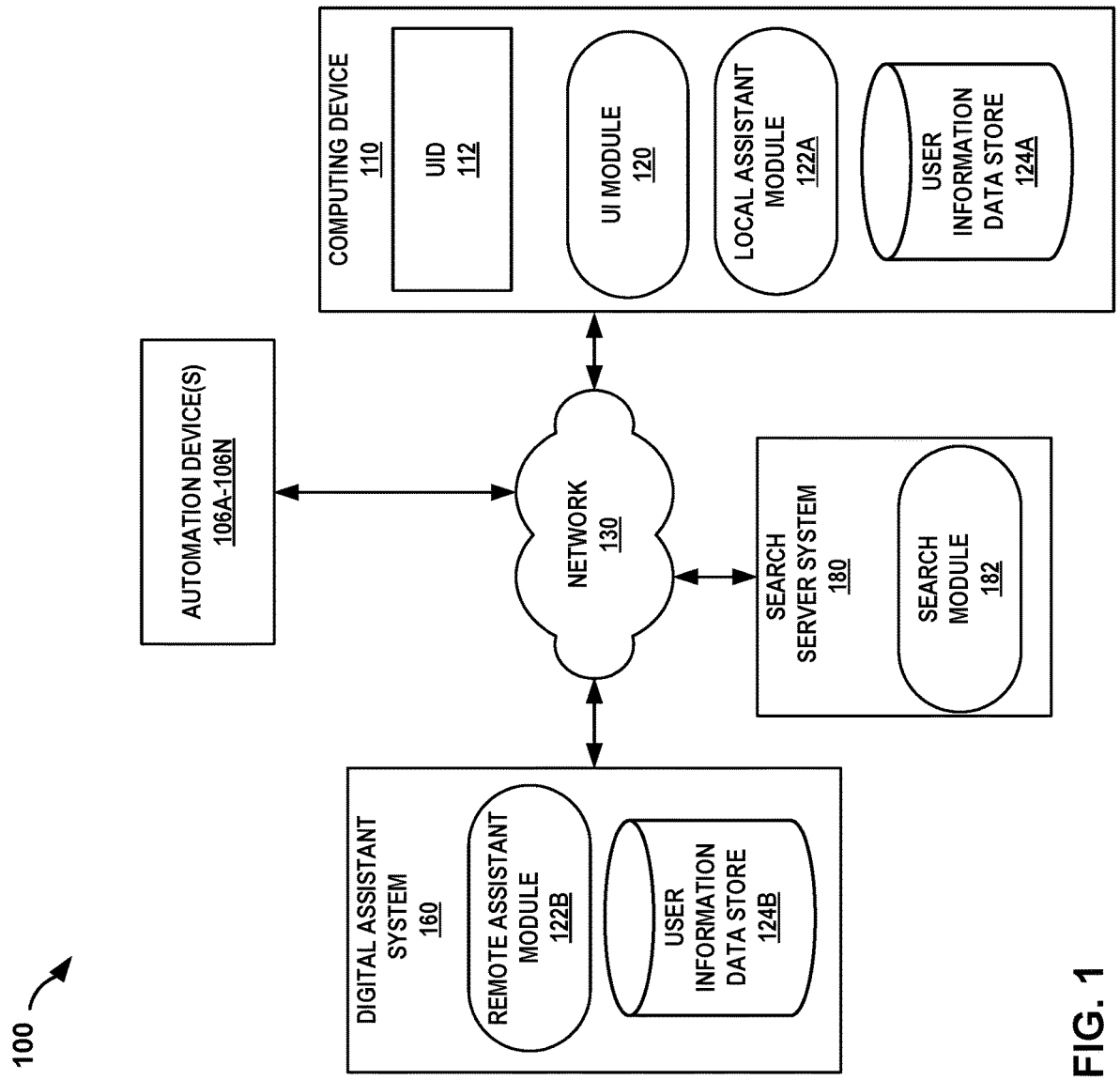
FIG. 1 is a conceptual diagram illustrating an example system that executes an example virtual assistant, in accordance with one or more aspects of the present disclosure.

FIG. 1 is a conceptual diagram illustrating an example system that executes an example virtual assistant, in accordance with one or more aspects of the present disclosure. System 100 of FIG. 1 includes digital assistant system 160 in communication, via network 130, with automation devices 106A-106N (collectively, "automation devices 106"), search server system 180 and computing device 110. Although system 100 is shown as being distributed amongst assistant automation devices 106, digital assistant system 160, search server system 180, and computing device 110, in other examples, the features and techniques attributed to system 100 may be performed internally, by local components of computing device 110. Similarly, digital assistant system 160 may include certain components and perform various techniques that are otherwise attributed in the below description to search server system 180 and/or computing device 110.

Network 130 represents any public or private communications network, for instance, cellular, Wi-Fi, and/or other types of networks, for transmitting data between computing systems, servers, and computing devices. Digital assistant system 160 may exchange data, via network 130, with computing device 110 to provide a virtual assistant service that is accessible to computing device 110 when computing device 110 is connected to network 130. Digital assistant system 160 may exchange data, via network 130, with search server system 180 to access a search service provided by search server system 180. Computing device 110 may exchange data, via network 130, with search server system 180 to access the search service provided by search server system 180.

Network 130 may include one or more network hubs, network switches, network routers, or any other network equipment, that are operatively inter-coupled thereby providing for the exchange of information between systems 160 and 180 and computing device 110. Computing device 110, digital assistant system 160, and search server system 180 may transmit and receive data across network 130 using any suitable communication techniques. Computing device 110, digital assistant system 160, and search server system 180 may each be operatively coupled to network 130 using respective network links. The links coupling computing device 110, digital assistant system 160, and search server system 180 to network 130 may be Ethernet or other types of network connections and such connections may be wireless and/or wired connections.

Digital assistant system 160 and search server system 180 represent any suitable remote computing systems, such as one or more desktop computers, laptop computers, mainframes, servers, cloud computing systems, etc. capable of sending and receiving information both to and from a network, such as network 130. Digital assistant system 160 hosts (or at least provides access to) a virtual assistant service. Search server system 180 hosts (or at least provides access to) a search service. In some examples, digital assistant system 160 and search server system 180 represent cloud computing systems that provide access to their respective services via a cloud.

Automation devices 106 represent any suitable automation devices, such as locks, lights, powered blinds or other window coverings, garage door openers, lawn sprinklers, fans, smoke and/or carbon monoxide detectors, kitchen appliances, speakers, thermostats or other climate control devices, security cameras, alarm systems, doorbells, chargers, pet food dispensers, leak and/or flood sensors, energy monitoring devices, televisions or other audio/video devices, powered mattresses, etc. capable of sending and receiving information both to and from a network, such as network 130. In some examples, automation devices 106 may be referred to as so called smart devices or internet-of-things (IoT) devices. In some examples, automation devices 106 may home automation devices in that automation devices 106 may be located in, on, or around a residence. However, in general, automation devices 106 may be located in, on, or around any setting including commercial (e.g., retail, office, and the like), residential, industrial, governmental (e.g., airport, municipal, military, and the like), or other settings.

Each of automation devices 106 may be configured to perform one or more automation actions. As one example, a door or window lock of automation devices 106 may be configured to perform a lock action that locks the door or window and an unlock action that unlocks the door or window. As another example, a garage door opener of automation devices 106 may be configured to perform an open action that opens a garage door in communication with the garage door opener and a close action that closes the garage door in communication with the garage door opener. As another example, a thermostat of automation devices 106 may be configured to perform a temperature adjustment action (e.g., to raise or lower the temperature set-point), a humidity adjustment action (e.g., to raise or lower the humidity set-point), a fan activation action (e.g., to activate a fan of a heating ventilation and air-conditioning (HVAC) system), and/or a fan deactivation action (e.g., to deactivate a fan of a HVAC system).

Automation devices 106 may perform automation actions in response to receiving requests from other devices, such as computing device 110 or digital assistant system 160. For instance, a pet food dispenser of automation devices 106 may perform a dispense-food action in response to receiving a request from computing device 110 (e.g., via network 130) to perform the dispense-food action.

Computing device 110 represents one or more individual mobile or non-mobile computing devices. Examples of computing device 110 include a mobile phone, a tablet computer, a laptop computer, a desktop computer, a server, a mainframe, a set-top box, a television, a wearable device (e.g., a computerized watch, computerized eyewear, computerized gloves, etc.), a home automation device or system (e.g., an intelligent thermostat or home assistant device), a personal digital assistants (PDA), a gaming system, a media player, an e-book reader, a mobile television platform, an automobile navigation or infotainment system, or any other type of mobile, non-mobile, wearable, and non-wearable computing device configured to execute or access a virtual assistant and receive information via a network, such as network 130.

Digital assistant system 160 and/or search server system 180 may communicate with computing device 110 via network 130 to give computing device 110 access the virtual assistant service provided by digital assistant system 160 and/or to provide computing device 110 access to the search service provided by search server system 180. In the course of providing virtual assistant services, digital assistant system 160 may communicate with search server system 180 via network 130 to obtain search results for providing a user of the virtual assistant service information to complete a task.

In the example of FIG. 1, digital assistant system 160 includes remote assistant module 122B and user information data store 124B. Remote assistant module 122B may maintain user information data store 124B as part of a virtual assistant service that digital assistant system 160 provides via network 130 (e.g., to computing device 110). Computing device 110 includes user interface device (UID) 112, user interface (UI) module 120, local assistant module 122A, and user information data store 124A. Local assistant module 122A may maintain user information data store 124A as part of a virtual assistant service that executes locally at computing device 110. Remote assistant module 122B and local assistant module 122A may be referred to collectively as assistant modules 122A and 122B. Local data store 124A and remote data store 124B may be referred to collectively as data stores 124A and 124B.

Modules 120, 122A, 122B, and 182 may perform operations described using software, hardware, firmware, or a mixture of hardware, software, and firmware residing in and/or executing at one of computing device 110, digital assistant system 160, or search server system 180. Computing device 110, digital assistant system 160, and search server system 180 may execute modules 120, 122A, 122B, and 182 with multiple processors or multiple devices. Computing device 110, digital assistant system 160, and search server system 180 may execute modules 120, 122A, 122B, and 182 as virtual machines executing on underlying hardware. Modules 120, 122A, 122B, and 182 may execute as one or more services of an operating system or computing platform. Modules 120, 122A, 122B, and 182 may execute as one or more executable programs at an application layer of a computing platform.

UID 112 of computing device 110 may function as an input and/or output device for computing device 110. UID 112 may be implemented using various technologies. For instance, UID 112 may function as an input device using presence-sensitive input screens, such as resistive touchscreens, surface acoustic wave touchscreens, capacitive touchscreens, projective capacitance touchscreens, pressure sensitive screens, acoustic pulse recognition touchscreens, or another presence-sensitive display technology.

UID 112 may function as an input device using microphone technologies, infrared sensor technologies, or other input device technology for use in receiving user input. For example, UID 112 may detect, using built-in microphone technology, voice input that UI module 120 and/or local assistant module 122A processes for completing a task. As another example, UID 112 may include a presence-sensitive display that may receive tactile input from a user of computing device 110. UID 112 may receive indications of tactile input by detecting one or more gestures from a user (e.g., the user touching or pointing to one or more locations of UID 112 with a finger or a stylus pen).

UID 112 may function as output (e.g., display) device and present output to a user. UID 112 may function as an output device using any one or more display devices, such as liquid crystal displays (LCD), dot matrix displays, light emitting diode (LED) displays, organic light-emitting diode (OLED) displays, e-ink, or similar monochrome or color displays capable of outputting visible information to a user of computing device 110. UID 112 may function as output device using speaker technologies, haptic feedback technologies, or other output device technology for use in outputting information to a user. UID 112 may present a user interface related to a virtual assistant provided by local assistant module 122A and/or remote assistant module 122B. UID 112 may present a user interface related to other features of computing platforms, operating systems, applications, and/or services executing at and/or accessible from computing device 110 (e.g., e-mail, chat, online services, telephone, gaming, etc.).

UI module 120 may manage user interactions with UID 112 and other components of computing device 110 including interacting with digital assistant system 160 so as to provide assistant services via UID 112. UI module 120 may cause UID 112 to output a user interface as a user of computing device 110 views output and/or provides input at UID 112. UI module 120 and UID 112 may receive one or more indications of input (e.g., voice input, gesture input, etc.) from a user as the user interacts with the user interface, at different times and when the user and computing device 110 are at different locations. UI module 120 and UID 112 may interpret inputs detected at UID 112 and may relay information about the inputs detected at UID 112 to local assistant module 122A and/or one or more other associated platforms, operating systems, applications, and/or services executing at computing device 110, for example, to cause computing device 110 to perform functions.

UI module 120 may receive information and instructions from one or more associated platforms, operating systems, applications, and/or services executing at computing device 110 and/or one or more remote computing systems, such as systems 160 and 180. In addition, UI module 120 may act as an intermediary between the one or more associated platforms, operating systems, applications, and/or services executing at computing device 110, and various output devices of computing device 110 (e.g., speakers, LED indicators, audio or haptic output device, etc.) to produce output (e.g., a graphic, a flash of light, a sound, a haptic response, etc.) with computing device 110.

Search module 182 may execute a search for information determined to be relevant to a search query that search module 182 automatically generates (e.g., based on contextual information associated with computing device 110) or that search module 182 receives from digital assistant system 160 or computing device 110 (e.g., as part of a task that a virtual assistant is completing on behalf of a user of computing device 110). Search module 182 may conduct an Internet search based on a search query to identify information (e.g., weather or traffic conditions, news, stock prices, sports scores, user schedules, transportation schedules, retail prices, etc.) related to the search query from amongst from a variety of information sources (e.g., either stored locally or remote to search server system 180). After executing a search, search module 182 may output the information returned from the search (e.g., the search results) to digital assistant system 160 or computing device 110.

Local assistant module 122A of computing device 110 and remote assistant module 122B of digital assistant system 160 may each perform similar functions described herein for automatically executing an assistant that is configured to obtain personal information associated with a user of a computing device during ongoing conversations between the user and the assistant. Remote assistant module 122B and user information data store 124B represent server-side or cloud implementations of an example virtual assistant whereas local assistant module 122A and user information data store 124A represent a client-side or local implementation of the example virtual assistant.

Modules 122A and 122B (collectively, "assistant modules 122") may each include respective software agents configured to execute as intelligent personal assistants that can perform tasks or services for an individual, such as a user of computing device 110. Assistant modules 122 may perform these tasks or services based on user input (e.g., detected at UID 112), location awareness (e.g., based on context), and/or the ability to access other information (e.g., weather or traffic conditions, news, stock prices, sports scores, user schedules, transportation schedules, retail prices, etc.) from a variety of information sources (e.g., either stored locally at computing device 110, digital assistant system 160, or obtained via the search service provided by search server system 180). Assistant modules 122 may perform artificial intelligence and/or machine learning techniques to automatically identify and complete one or more tasks on behalf of a user.

The respective assistant provided by assistant modules 122 may be configured to trigger or otherwise initiate performance of automation actions in the course of executing operations to satisfy verbal or spoken requests of users of computing device 110. For instance, the assistant provided by assistant modules 122 may receive, with one or more microphones of computing device 110, acoustic input (e.g., audio data) that corresponds to an utterance a user of computing device 110 requesting performance of a particular automation action (e.g., "unlock the front door"). The assistant provided by assistant modules 122 may analyze the audio data to identify an automation action and associated automation devices of automation devices 106 that corresponds to the spoken utterance. For instance, the assistant provided by assistant modules 122 may utilize speech recognition to determine that the spoken utterance of "unlock the front door" corresponds to an unlock action performed by a lock of automation devices 106 associated with a front door. The assistant provided by assistant modules 122 may cause the identified automation devices of automation devices 106 to perform the identified automation action. For instance, the assistant provided by assistant modules 122 may output a request to perform an unlock action to the lock of automation devices 106 associated with the front door. In this way, the assistant provided by assistant modules 122 may facilitate performance of automation actions to satisfy verbal or spoken requests of users of computing device 110.

Computing device 110 may be utilized by multiple users (e.g., multiple different users may provide spoken utterances to computing device 110). As one example, where computing device 110 is located in a residential setting, computing device 110 may be utilized by family members, roommates, guests, etc. As another example, where computing device 110 is located in a commercial or industrial setting, computing device 110 may be utilized by various managers, workers, security guards, visitors, etc.

In some examples, it may not be desirable for every user of computing device 110 to be able to trigger every available automation action. For instance, it may not be desirable for every user of computing device 110 to be able to trigger an unlock action performed by a lock of automation devices 106 associated with a front door. On the other hand, it may be desirable for every user of computing device 110 to be able to trigger a dimming action of a light of automation devices 106.

In accordance with one or more techniques of this disclosure, the assistant provided by assistant modules 122 may selectively restrict performance of automation actions in response to a spoken utterance based on an identify of the user that provided the spoken utterance (referred to below as the "requesting user"). In operation, the assistant provided by assistant modules 122 may receive, with one or more microphones of computing device 110, acoustic input (e.g., audio data) that corresponds to an utterance a user of computing device 110 requesting performance of a particular automation action (e.g., "unlock the front door"). In some examples, the assistant provided by assistant modules 122 may receive the audio data that corresponds to the utterance based on a trigger phrase (e.g., "OK Computer," "Hey Device," etc.) being recognized by computing device 110 from audio data generated by the one or more microphones of computing device 110.

The assistant provided by assistant modules 122 may identify the requesting user. For instance, the assistant provided by assistant modules 122 may perform speaker recognition by comparing the audio data with a voice prints of one or more users configured to utilize computing device 110. As discussed in further detail below, the voice prints of one or more users configured to utilize computing device 110 may be stored in user information store 124A and/or user information store 124B. If the performance of speaker recognition yields a matching voice print, the assistant provided by assistant modules 122 may determine that the requesting user is the user that corresponds to the matching voice print. If the performance of speaker recognition does not yield a matching voice print, the assistant provided by assistant modules 122 may determine that the requesting user is a guest user.

The assistant provided by assistant modules 122 may analyze, parse, or otherwise process the audio data to identify an automation action and associated automation devices of automation devices 106 that correspond to the spoken utterance. For instance, the assistant provided by assistant modules 122 may utilize speech recognition to determine that the spoken utterance of "unlock the front door" corresponds to an unlock action performed by a lock of automation devices 106 associated with a front door.

The assistant provided by assistant modules 122 may determine whether the identified user is authorized to cause performance of the identified automation action. For instance, the assistant provided by assistant modules 122 may determine whether permission settings (authorization settings, access rights, or the like) indicate that the identified user is authorized to cause performance of the identified automation action. As discussed in further detail below, the permission settings may be stored in user information store 124A and/or user information store 124B.

Responsive to determining that the identified user is authorized to cause performance of the identified automation action, the assistant provided by assistant modules 122 may cause the identified automation devices of automation devices 106 to perform the identified automation action. For instance, responsive to determining that the identified user is authorized to cause performance of the unlock action to the lock of automation devices 106 associated with the front door, the assistant provided by assistant modules 122 may output a request to perform the unlock action to the lock of automation devices 106 associated with the front door.

Responsive to determining that the identified user is not authorized to cause performance of the identified automation action, the assistant provided by assistant modules 122 may not cause the identified automation devices of automation devices 106 to perform the identified automation action. In some of such examples, the assistant provided by assistant modules 122 may output an indication via UID 112 that the identified user is not authorized to cause performance of the identified automation action. For instance, the assistant provided by assistant modules 122 may cause UID 112 to output audio data with a synthesized voice saying that the identified user is not authorized to cause performance of the identified automation action (e.g., "I'm sorry, you do not appear to be authorized to unlock the front door"). In this way, the assistant provided by assistant modules 122 may facilitate performance of automation actions to satisfy verbal or spoken requests of users of computing device 110 while also improving the security of system 100.

The respective assistant provided by remote assistant module 122B and local assistant module 122A may, in the course of executing operations to support conversations with a user of computing device 110, automatically create, generate, or otherwise maintain personal records of information obtained during the conversations and store the personal records as values that are specific to the user, in a structured and semantic fashion as user information data store 124B and user information data store 124A, respectively. Data stores 124B and 124A may enable, respectively, the respective assistant executed by remote assistant module 122B and local assistant module 122A to quickly access the personal information (e.g., the values that are specific to the user) to complete a real-world task (e.g., an automation action), a virtual task, or otherwise respond to immediate or future need of the user of computing device 110. For ease of description, the techniques of this disclosure are described primarily from the perspective of being performed by local assistant module 122A.

Assistant modules 122A and 122B may maintain user information data stores 124A and 124B as part of a virtual assistant service that assistant modules 122A and 122B together, or separately, provide to computing device 110. The assistant(s) provided by assistant modules 122 may, in the course of executing operations to support a conversation with users of computing device 110, maintain personal records of the information being automatically culled from the conversations and store the personal records in a structured and semantic fashion as user information data store 124A and 124B. Data stores 124A and 124B may enable the assistant executed by assistant modules 122A and 122B to quickly access the personal information to complete a real-world task, a virtual task, or otherwise respond to immediate and/or future needs of the user of computing device 110.

Assistant modules 122A and 122B may only retain personal records associated with a user of computing device 110 after first receiving explicit permission from the user to do-so. Thus, the user may have complete control over how the assistant collects and uses information about the user, including the permission settings and automation action usage history. For example, prior to retaining information associated with the users of computing device 110, assistant modules 122A and 122B may cause UI module 120 to present a user interface via UID 112 that requests users to select a box, click a button, state a voice input, or otherwise provide a specific input to the user interface that is interpreted by assistant modules 122A and 122B as unambiguous, affirmative consent for assistant modules 122A and 122B to collect and make use of the user's personal information.

Assistant modules 122A and 122B may encrypt or otherwise treat the information being maintained as personal records to remove the actual identity of the user before storing the personal information at data stores 124A and 124B. For example, the information may be treated by assistant modules 122A and 122B so that any personally-identifiable information is removed from the personal records of the user when stored at data stores 124A and 124B.

Assistant modules 122A and 122B may cause UI module 120 to present a user interface via UID 112 from which the user of computing device 110, may modify or remove information from the personal records stored at data stores 124A and 124B. For example, the user interface may provide areas at which the user of computing device 110 can provide input to communicate to assistant modules 122A and 122B a command to modify or remove specific pieces of personal information. In this way, the user of computing device 110 may have complete control over the information being retained by assistant modules 122A and 122B at data stores 124A and 124B.

Each entry in the personal records stored by data stores 124A and 124B may be associated with a predefined schema that can be quickly traversed or parsed by assistant modules 122A and 122B to find the information assistant modules 122A and 122B need at a current time for understanding user needs and for helping the user to complete a task. Once personal information has been recorded as one or more values that are specific to a user, assistant modules 122A and 122B can quickly use information stored at data stores 124A and 124B to complete a task. If there is no ongoing task, assistant modules 122A and 122B may provide the user with examples of how the assistant may use the information to help the user in the future. The user may later provide input at UID 112 to command assistant modules 122A and 122B to forget or modify this information.

The values stored by data stores 124A and 124B may be textual values (e.g., names of persons, names of places, other textual descriptors of entities), numerical values (e.g., age, height, weight, other physiological data, other numerical information associated with entities), or pointers to values specific to a user (e.g., a location in memory to an entity in a knowledge graph of a user, a location in memory to a contact in an address book, etc.). In other words, a value specific to a user may take many forms and be specific to a field of a personal record that is defined by the recording schema. The value may indicate the actual information that is specific to the user or may be a reference to a location from which the information specific to the user can be retrieved.

After assistant modules 122A and 122B receives an indication of user input detected by UID 112 that indicates the user consents to providing assistant modules 122A and 122B with personal information about the user (e.g., the user's voice print), assistant modules 122A and 122B may receive an indication of user input (e.g., a natural language voice) from UI module 120 that includes audio data of the user reciting one or more phrases from which a voice print may be generated. As discussed above, the voice prints of users enrolled or otherwise registered with computing device 110 in this way may be stored in user information store 124A and/or user information store 124B. As also discussed above, in some examples, the assistant provided by assistant modules 122 may utilize the voice prints stored in user information store 124A and/or user information store 124B when identifying which user provided a spoken utterance.

The assistant provided by assistant modules 122 may manage creation and updating of the permission settings for automation devices. For instance, while facilitating the addition of a new automation device of automation devices 106 to system 100 (e.g., guiding a user through a setup procedure and associating the new automation device with system 100), the assistant provided by assistant modules 122 may request that an administrator (or other privileged user, such as an owner or the first user configured to utilize computing device 110) select which users and/or user groups are authorized to access the new automation device. The assistant provided by assistant modules 122 may store (e.g., in user information data store 124A and/or 124B) a record of the new automation device along with permission settings that reflect the administrator's selections of which users and/or user groups are authorized to access the new automation device. The record of the new automation device may include indications of what automation actions the new automation device is capable of, contact information for the new automation device (e.g., MAC address, IP address, or the like), and/or any other information that the assistant provided by assistant modules 122 may use to control the new automation device. In some examples, the records of all of the automation devices may be stored in a graph structure. In the residential context, the graph structure may be referred to as a home graph.

Figure 2:
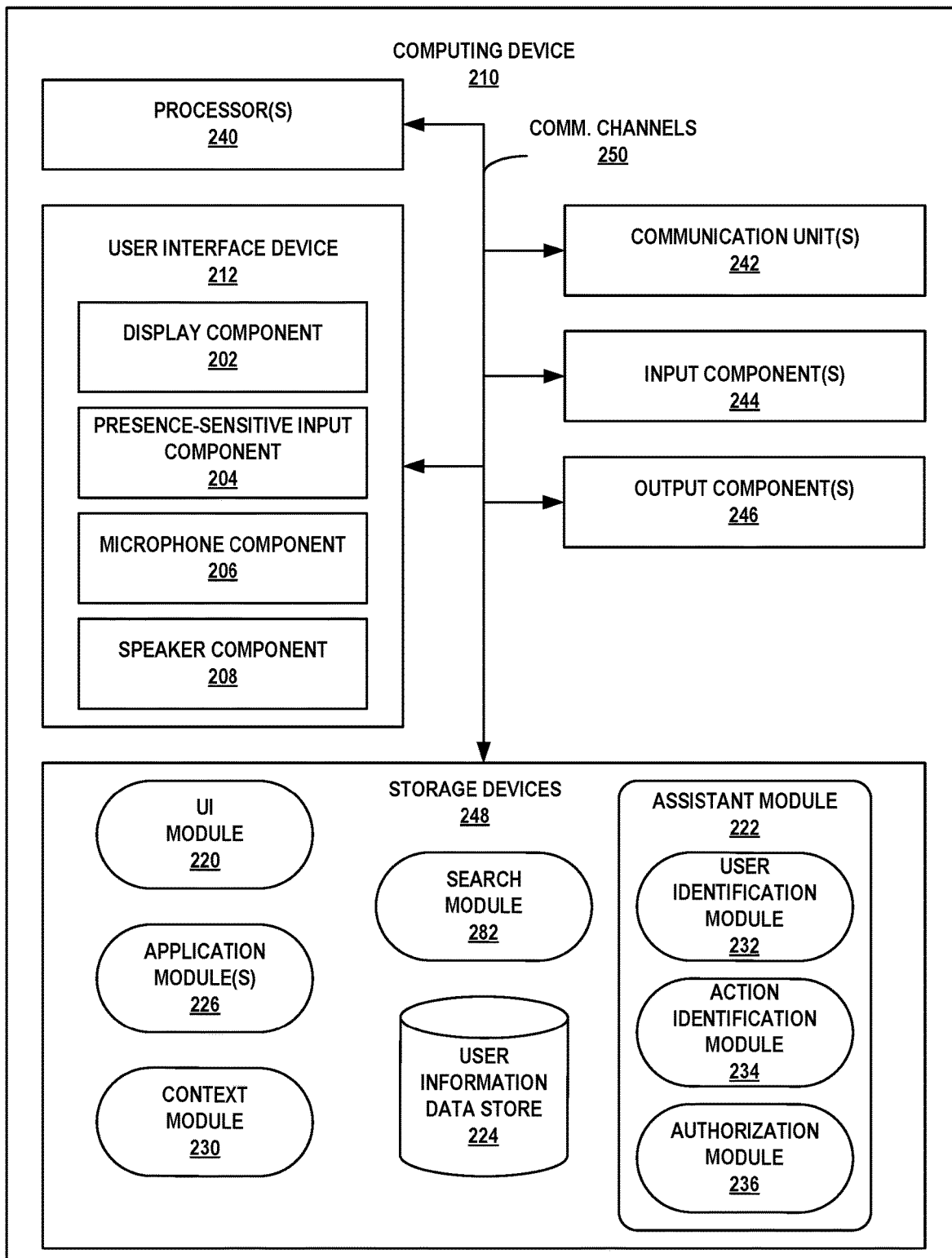
FIG. 2 is a block diagram illustrating an example computing device that is configured to execute an example virtual assistant, in accordance with one or more aspects of the present disclosure.

FIG. 2 is a block diagram illustrating an example computing device that is configured to execute an example virtual assistant, in accordance with one or more aspects of the present disclosure. Computing device 210 of FIG. 2 is described below as an example of computing device 110 of FIG. 1. FIG. 2 illustrates only one particular example of computing device 210, and many other examples of computing device 210 may be used in other instances and may include a subset of the components included in example computing device 210 or may include additional components not shown in FIG. 2.

As shown in the example of FIG. 2, computing device 210 includes user interface device (UID) 212, one or more processors 240, one or more communication units 242, one or more input components 244, one or more output components 246, and one or more storage components 248. UID 212 includes display component 202, presence-sensitive input component 204, microphone component 206, and speaker component 208. Storage components 248 of computing device 210 include UI module 220, assistant module 222, search module 282, one or more application modules 226, context module 230, user information data store 224, user identification module 232, action identification module 234, and authorization module 236.

Communication channels 250 may interconnect each of the components 212, 240, 242, 244, 246, and 248 for inter-component communications (physically, communicatively, and/or operatively). In some examples, communication channels 250 may include a system bus, a network connection, an inter-process communication data structure, or any other method for communicating data.

One or more communication units 242 of computing device 210 may communicate with external devices (e.g., digital assistant system 160 and/or search server system 180 of system 100 of FIG. 1) via one or more wired and/or wireless networks by transmitting and/or receiving network signals on one or more networks (e.g., network 130 of system 100 of FIG. 1). Examples of communication units 242 include a network interface card (e.g. such as an Ethernet card), an optical transceiver, a radio frequency transceiver, a GPS receiver, or any other type of device that can send and/or receive information. Other examples of communication units 242 may include short wave radios, cellular data radios, wireless network radios, as well as universal serial bus (USB) controllers.

One or more input components 244 of computing device 210 may receive input. Examples of input are tactile, audio, and video input. Input components 242 of computing device 210, in one example, includes a presence-sensitive input device (e.g., a touch sensitive screen, a PSD), mouse, keyboard, voice responsive system, camera, microphone or any other type of device for detecting input from a human or machine. In some examples, input components 242 may include one or more sensor components one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., infrared proximity sensor, hygrometer sensor, and the like). Other sensors, to name a few other non-limiting examples, may include a heart rate sensor, magnetometer, glucose sensor, olfactory sensor, compass sensor, step counter sensor.

One or more output components 246 of computing device 110 may generate output. Examples of output are tactile, audio, and video output. Output components 246 of computing device 210, in one example, includes a presence-sensitive display, sound card, video graphics adapter card, speaker, cathode ray tube (CRT) monitor, liquid crystal display (LCD), or any other type of device for generating output to a human or machine.

UID 212 of computing device 210 may be similar to UID 112 of computing device 110 and includes display component 202, presence-sensitive input component 204, microphone component 206, and speaker component 208. Display component 202 may be a screen at which information is displayed by UID 212 while presence-sensitive input component 204 may detect an object at and/or near display component 202. Speaker component 208 may be a speaker from which audible information is played by UID 212 while microphone component 206 may detect audible input provided at and/or near display component 202 and/or speaker component 208.

While illustrated as an internal component of computing device 210, UID 212 may also represent an external component that shares a data path with computing device 210 for transmitting and/or receiving input and output. For instance, in one example, UID 212 represents a built-in component of computing device 210 located within and physically connected to the external packaging of computing device 210 (e.g., a screen on a mobile phone). In another example, UID 212 represents an external component of computing device 210 located outside and physically separated from the packaging or housing of computing device 210 (e.g., a monitor, a projector, etc. that shares a wired and/or wireless data path with computing device 210).

As one example range, presence-sensitive input component 204 may detect an object, such as a finger or stylus that is within two inches or less of display component 202. Presence-sensitive input component 204 may determine a location (e.g., an [x, y] coordinate) of display component 202 at which the object was detected. In another example range, presence-sensitive input component 204 may detect an object six inches or less from display component 202 and other ranges are also possible. Presence-sensitive input component 204 may determine the location of display component 202 selected by a user's finger using capacitive, inductive, and/or optical recognition techniques. In some examples, presence-sensitive input component 204 also provides output to a user using tactile, audio, or video stimuli as described with respect to display component 202. In the example of FIG. 2, UID 212 may present a user interface (such as a graphical user interface).

Speaker component 208 may comprise a speaker built-in to a housing of computing device 210 and in some examples, may be a speaker built-in to a set of wired or wireless headphones that are operably coupled to computing device 210. Microphone component 206 may detect audible input occurring at or near UID 212. Microphone component 206 may perform various noise cancellation techniques to remove background noise and isolate user speech from a detected audio signal.

UID 212 of computing device 210 may detect two-dimensional and/or three-dimensional gestures as input from a user of computing device 210. For instance, a sensor of UID 212 may detect a user's movement (e.g., moving a hand, an arm, a pen, a stylus, etc.) within a threshold distance of the sensor of UID 212. UID 212 may determine a two or three-dimensional vector representation of the movement and correlate the vector representation to a gesture input (e.g., a hand-wave, a pinch, a clap, a pen stroke, etc.) that has multiple dimensions. In other words, UID 212 can detect a multi-dimension gesture without requiring the user to gesture at or near a screen or surface at which UID 212 outputs information for display. Instead, UID 212 can detect a multi-dimensional gesture performed at or near a sensor which may or may not be located near the screen or surface at which UID 212 outputs information for display.

One or more processors 240 may implement functionality and/or execute instructions associated with computing device 210. Examples of processors 240 include application processors, display controllers, auxiliary processors, one or more sensor hubs, and any other hardware configure to function as a processor, a processing unit, or a processing device. Modules 220, 222, 226, 230, 232, 234, 236, and 282 may be operable by processors 240 to perform various actions, operations, or functions of computing device 210. For example, processors 240 of computing device 210 may retrieve and execute instructions stored by storage components 248 that cause processors 240 to perform the operations modules 220, 222, 226, 230, 232, 234, 236, and 282. The instructions, when executed by processors 240, may cause computing device 210 to store information within storage components 248.

One or more storage components 248 within computing device 210 may store information for processing during operation of computing device 210 (e.g., computing device 210 may store data accessed by modules 220, 222, 226, 230, 232, 234, 236, and 282 during execution at computing device 210). In some examples, storage component 248 is a temporary memory, meaning that a primary purpose of storage component 248 is not long-term storage. Storage components 248 on computing device 210 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with modules 220, 222, 226, 230, 232, 234, 236, and 282 and data store 224. Storage components 248 may include a memory configured to store data or other information associated with modules 220, 222, 226, 230, 232, 234, 236, and 282 and data store 224.

UI module 220 may include all functionality of UI module 120 of computing device 110 of FIG. 1 and may perform similar operations as UI module 120 for managing a user interface that computing device 210 provides at UID 212 for example, for facilitating interactions between a user of computing device 110 and assistant module 222. For example, UI module 220 of computing device 210 may receive information from assistant module 222 that includes instructions for outputting (e.g., displaying or playing audio) an assistant user interface. UI module 220 may receive the information from assistant module 222 over communication channels 250 and use the data to generate a user interface. UI module 220 may transmit a display or audible output command and associated data over communication channels 250 to cause UID 212 to present the user interface at UID 212.

In some examples, UI module 220 may receive an indication of one or more user inputs detected at UID 212 and may output information about the user inputs to assistant module 222. For example, UID 212 may detect a voice input from a user and send data about the voice input to UI module 220.

UI module 220 may send an indication of the voice input to assistant module 222 for further interpretation. Assistant module 222 may determine, based on the voice input, that the detected voice input represents a user request for assistant module 222 to perform one or more tasks.

Application modules 226 represent all the various individual applications and services executing at and accessible from computing device 210 that may be accessed by an assistant, such as assistant module 222, to provide user with information and/or perform a task. A user of computing device 210 may interact with a user interface associated with one or more application modules 226 to cause computing device 210 to perform a function. Numerous examples of application modules 226 may exist and include, a fitness application, a calendar application, a search application, a map or navigation application, a transportation service application (e.g., a bus or train tracking application), a social media application, a game application, an e-mail application, a chat or messaging application, an Internet browser application, or any and all other applications that may execute at computing device 210.

Search module 282 of computing device 210 may perform integrated search functions on behalf of computing device 210. Search module 282 may be invoked by UI module 220, one or more of application modules 226, and/or assistant module 222 to perform search operations on their behalf. When invoked, search module 282 may perform search functions, such as generating search queries and executing searches based on generated search queries across various local and remote information sources. Search module 282 may provide results of executed searches to the invoking component or module. That is, search module 282 may output search results to UI module 220, assistant module 222, and/or application modules 226 in response to an invoking command.

Context module 230 may collect contextual information associated with computing device 210 to define a context of computing device 210. Specifically, context module 230 is primarily used by assistant module 222 to define a context of computing device 210 that specifies the characteristics of the physical and/or virtual environment of computing device 210 and a user of computing device 210 at a particular time.

As used throughout the disclosure, the term "contextual information" is used to describe any information that can be used by context module 230 to define the virtual and/or physical environmental characteristics that a computing device, and the user of the computing device, may experience at a particular time. Examples of contextual information are numerous and may include: sensor information obtained by sensors (e.g., position sensors, accelerometers, gyros, barometers, ambient light sensors, proximity sensors, microphones, and any other sensor) of computing device 210, communication information (e.g., text based communications, audible communications, video communications, etc.) sent and received by communication modules of computing device 210, and application usage information associated with applications executing at computing device 210 (e.g., application data associated with applications, Internet search histories, text communications, voice and video communications, calendar information, social media posts and related information, etc.). Further examples of contextual information include signals and information obtained from transmitting devices that are external to computing device 210. For example, context module 230 may receive, via a radio or communication unit of computing device 210, beacon information transmitted from external beacons located at or near a physical location of a merchant.

Assistant module 222 may include all functionality of local assistant module 122A of computing device 110 of FIG. 1 and may perform similar operations as local assistant module 122A for providing an assistant. In some examples, assistant module 222 may execute locally (e.g., at processors 240) to provide assistant functions. In some examples, assistant module 222 may act as an interface to a remote assistant service accessible to computing device 210. For example, assistant module 222 may be an interface or application programming interface (API) to remote assistant module 122B of digital assistant system 160 of FIG. 1. As shown in FIG. 2, assistant module 222 may include user identification module 232, action identification module 234, and authorization module 236.

User identification module 232 may be executable by processors 240 to identify a user that provided a spoken utterance based on audio data representing the spoken utterance. In other words, user identification module 232 may perform speaker (i.e., user) recognition. In some examples, user identification module 232 may identify the user based in part on a comparison between the audio data and a voice prints of one or more users configured to utilize computing device 210. For instance, user identification module 232 may determine a score that represents how accurately the audio data matches the voice print of each user configured to utilize computing device 210, and determine that the user corresponding to the highest (the scores are described herein as being positively correlated with matching accuracy such that higher scores indicate better matches although negative correlation, such as golf scoring where lower is better, is also contemplated) matching voice prints rescore provided the utterance. In some examples, user identification module 232 may determine that there are no matching voice prints if the highest score is below a threshold value.

If the comparison yields a matching voice print of a particular user configured to utilize computing device 210, user identification module 232 may identify the particular user as the user that provided the spoken utterance. If the comparison does not yield a matching voice print of a user configured to utilize computing device 210, user identification module 232 may identify the user that provided the spoken utterance as a guest user that is not registered with computing device 210.

As discussed above, in some examples, assistant modules 222 may receive the audio data that corresponds to the utterance based on a trigger phrase (e.g., "OK Computer," "Hey Device," etc.) being spoken by the user and recognized by computing device 210. In some examples, each user configured to use and/or registered with computing device 210 may be associated with a respective trigger phrase. For instance, while registering with computing device 210, a first may select a first trigger phrase (e.g., "Hi Jeeves") that the first user may speak in order to activate further audio reception by computing device 210 and a second user may select a second trigger phrase (e.g., "Hey Bartender") in order to activate further audio reception by computing device 210. As such, a trigger phrase associated with a first user of a plurality of users registered with computing device 210 may be different than a trigger phrase associated with a second user of the plurality of users. Additionally, in some examples, further audio reception by computing device 210 may be activated in response to computing device 210 recognizing a generic or guest trigger phrase (e.g., "OK Assistant Provider Company").

In some examples, user identification module 232 may identify the user based at least in part on the trigger phrase recognized by computing device 210 that activated reception of the audio data representing the spoken utterance. For instance, where the trigger phrase recognized by computing device 210 is associated with a first user of a plurality of users registered with computing device 210, user identification module 232 may identify the first user as the user that provided the spoken utterance (i.e., the requesting user). Similarly, where the trigger phrase recognized by computing device 210 is a generic or guest trigger phrase, user identification module 232 may identify the user that provided the spoken utterance as a guest user.

In some examples, user identification module 232 may identify the user based at least in part on the trigger phrase recognized by computing device 210 and a comparison between the audio data and a voice prints of one or more users configured to utilize computing device 210. For instance, user identification module 232 may increase the determined score of a voice print associated with a particular user (i.e., the determined score represents how well the audio data matches the voice print) where the trigger phrase recognized by computing device 210 is associated with the particular user.

Action identification module 234 may be executable by processors 240 to identify an automation action associated with one or more automation devices that corresponds to the spoken utterance. For instance, action identification module 234 may perform speech recognition on the audio data representing the spoken utterance to identify the automation action that corresponds to the spoken utterance. In some examples, action identification module 234 may identify only a single automation action candidate based on the audio data (i.e., an automation action that may to correspond to the utterance). In other examples, action identification module 234 may identify a plurality of automation action candidates based on the audio data (i.e., automation actions that may correspond to the utterance). Action identification module 234 may determine, for each of the automation action candidates, a score that represents how likely the automation action candidate corresponds to the spoken utterance (the scores are described herein as being positively correlated with matching accuracy such that higher scores indicate better matches although negative correlation, such as golf scoring where lower is better, is also contemplated). For instance, action identification module 234 may determine the automation action candidates and scores shown below in Table 1.

TABLE 1

| Automation Action Candidate | Authorized Users | Score |
|---|---|---|
| Turn on light action performed by a living room light | User A and Guest Users | 85 |
| Turn on light action performed by a light in User A's bedroom | User A | 80 |
| Turn on light action performed by a light in User B's bedroom | User B | 80 |

Action identification module 234 may select the automation action candidate of the plurality of automation action candidates with the score indicating the highest likelihood of corresponding to the spoken utterance (e.g., automation action candidate with the highest score) as the identified automation action. For instance, to continue with the above example, because the score for the "Turn on light action performed by a living room light" is the highest, action identification module 234 may select the "Turn on light action performed by a living room light" as the identified automation action.

In some examples, action identification module 234 may adjust the scores of the automation action candidates based on one or more factors. As one example, action identification module 234 may adjust the scores of the automation action candidates based the identified user. For instance, action identification module 234 may adjusting the scores of the automation action candidates that correspond to automation actions of-which the identified user is authorized to cause performance relative to the scores of the automation action candidates that correspond to automation actions of-which the identified user is not authorized to cause performance. To again use the above example in Table 1, if the identified user is User B, action identification module 234 may increase the scores of the automation action candidates of-which User B is authorized to cause performance. For instance, action identification module 234 may increase (e.g., add a fixed amount [e.g., 5 points, 10 points, etc.], multiply by a factor, etc.) the scores of the automation action candidates of-which User B is authorized to cause performance. Table 2, below, illustrates example updated scores where 10 points are added to the scores of the automation action candidates of-which User B is authorized to cause performance.

TABLE 2

| Automation Action Candidate | Authorized Users | Score |
|---|---|---|
| Turn on light action performed by a living room light | User A and Guest Users | 85 |
| Turn on light action performed by a light in User A's bedroom | User A | 80 |
| Turn on light action performed by a light in User B's bedroom | User B | 90 |

Action identification module 234 may select the automation action candidate of the plurality of automation action candidates with the post-adjustment score indicating the highest likelihood of corresponding to the spoken utterance (e.g., automation action candidate with the highest score) as the identified automation action. For instance, to continue with the above example of Table 2, because the score for the "Turn on light action performed by a light in User B's bedroom" is now the highest, action identification module 234 may select the "Turn on light action performed by a light in User B's bedroom" as the identified automation action.

As another example, action identification module 234 may adjust the scores of the automation action candidates based on which automation devices and automation actions are available, registered with action identification module 234, setup, and/or otherwise configured for use by users of computing device 210 (e.g., adjust the scores based on the graph, or home graph, structure). For instance, action identification module 234 may adjust the scores of the automation action candidates that correspond to automation actions which are configured for use by users of computing device 210 (e.g., in the graph structure) relative to the scores of the automation action candidates which are not configured for use by users of computing device 210. For instance, action identification module 234 may increase (e.g., by adding a fixed amount [e.g., 5 points, 10 points, etc.], multiplying by a factor, etc.) to the scores of the automation action candidates which are configured for use by users of computing device 210. To continue with the above example, assuming that the living room light, the light in User A's bedroom, and the light in User B's bedroom are all configured for use by users of computing device 210, Table 3, below, illustrates example updated scores where 10 points are added to the scores of the automation action candidates which are configured for use by users of computing device 210.

TABLE 3

| Automation Action Candidate | Authorized Users | Score |
|---|---|---|
| Turn on light action performed by a living room light | User A and Guest Users | 95 |
| Turn on light action performed by a light in User A's bedroom | User A | 90 |
| Turn on light action performed by a light in User B's bedroom | User B | 100 |

Action identification module 234 may select the automation action candidate of the plurality of automation action candidates with the post-adjustment score indicating the highest likelihood of corresponding to the spoken utterance (e.g., automation action candidate with the highest score) as the identified automation action. For instance, to continue with the above example of Table 3, because the score for the "Turn on light action performed by a light in User B's bedroom" remains the highest, action identification module 234 may select the "Turn on light action performed by a light in User B's bedroom" as the identified automation action.

While described in the above example as adjusting the scores based on both the identity of the user and configuration status, in some examples, action identification module 234 may adjust the scores based on only the identity of the user or only the configuration status. In other examples, action identification module 234 may not adjust the scores based either the identity of the user or the configuration status.

Authorization module 236 may be executable by processors 240 to determine whether the identified user is authorized to cause performance of the identified automation action. For instance, authorization module 236 may determine, based on permission settings, whether the identified user is authorized to cause performance of the identified automation action.

Responsive to determining that the identified user is authorized to cause performance of the identified automation action, authorization module 236 may cause the automation devices associated with the identified automation action to perform the identified automation action. For instance, authorization module 236 may cause one or more of communication units 242 to output, via a network and to the automation devices associated with the identified automation action, a message requesting performance of the identified automation action. In some examples, the message may include an indication of the identified user. However, in some examples, the message may not include an indication of the identified user. Therefore, in such examples, the automation devices associated with the identified automation action may remain unaware that the identified user is authorized to initiate performance of the identified automation action. In this way, the techniques of this disclosure may enable the implementation of access controls on verbal or spoken automation requests without requiring involvement of the automation devices. As such, techniques of this disclosure may enable the implementation of access controls on verbal or spoken automation requests performed by automation devices that may not be configured with any access control functionality, such as legacy automation devices.

Similar to data stores 124A and 124B of system 100 of FIG. 1, user information data store 224 may store information created by assistant module 222 that includes permission settings that indicate authorization to initiate automation actions by automation devices (e.g., automation devices 106 of FIG. 1). As discussed above, the assistant provided by assistant module 222 may utilize the permission settings stored by user information data store 224 to determine whether or not a user is authorized to initiate performance of an automation action.

The permission settings may be defined for any combination of individual users and groups of users. As one example, the permission settings may indicate which automation actions of-which a particular user is authorized to initiate performance. For instance, the permission settings may indicate that User A and User B are authorized to initiate performance of an unlock action performed by the lock of automation devices 106 associated with the front door, and indicate that a User C is not authorized to initiate performance of the unlock action performed by the lock of automation devices 106 associated with the front door. As another example, the permission settings may be defined for groups of users. For instance, the permission settings may indicate that users in a first group are authorized to initiate performance of the unlock action performed by the lock of automation devices 106 associated with the front door, and indicate that users in a second group (e.g., guest users) are not authorized to initiate performance of the unlock action performed by the lock of automation devices 106 associated with the front door. As another example, the permission settings may be defined for individual users and one or more groups of users. For instance, the permission settings may indicate that User A and User B are authorized to initiate performance of the unlock action performed by the lock of automation devices 106 associated with the front door, and indicate that User C and users in a second group (e.g., guest users) are not authorized to initiate performance of the unlock action performed by the lock of automation devices 106 associated with the front door.

The permission settings may be defined for any combination of automation action level and automation device level. As one example, automation action level permission settings may indicate the actions of-which a particular user or group of users are authorized to initiate performance. For instance, the permission settings may indicate that User A and users in a first group are authorized to initiate performance of the unlock action performed by the lock of automation devices 106 associated with the front door, and a temperature adjustment action by a thermostat of automation devices 106. As another example, automation device level the permission settings may indicate on-which of automation devices 106 a particular user or group of users are authorized to initiate performance of automation actions. For instance, the permission settings may indicate that User A and users in a first group are authorized to initiate performance of actions on the lock of automation devices 106 associated with the front door, and actions on the thermostat of automation devices 106. As another example, automation action level permission settings may co-exist with automation device level permission settings. For instance, if the device level permission settings indicate that a particular user is authorized to initiate performance of automation actions on a particular device and the action level permission settings do not indicate that the particular user is not authorized to initiate performance of specific actions by the particular device, the assistant provided by assistant module 222 may determine that the particular user is authorized to initiate performance of any action by the particular device.

The permission settings may be defined for users/group and/or for actions/devices. As one example, permission settings defined for users/groups may indicate of-which devices or actions a particular user or a particular group is authorized to utilize or initiate performance. For instance, permission settings for a particular user may indicate that the particular user is authorized to initiate performance of action A, action B, and action C. As another example, permission settings defined for actions/devices may indicates which users or which groups are authorized to utilize of initiate performance of the actions/devices. For instance, permission settings for a particular device may indicate that user A, user B, and user C are authorized to utilize and initiate actions on the particular device.

As described above, the permission settings may be defined in any combination of black lists (e.g., permission settings that indicate of-which devices/actions users or groups are not authorized to initiate performance), white lists (e.g., permission settings that indicate of-which devices/actions users or groups are authorized to initiate performance), and black and white lists. Assistant module 222 may rely on the information stored at data store 224, in addition to any information provided by context module 230 and/or search module 282, to perform assistant tasks.

Figure 3:
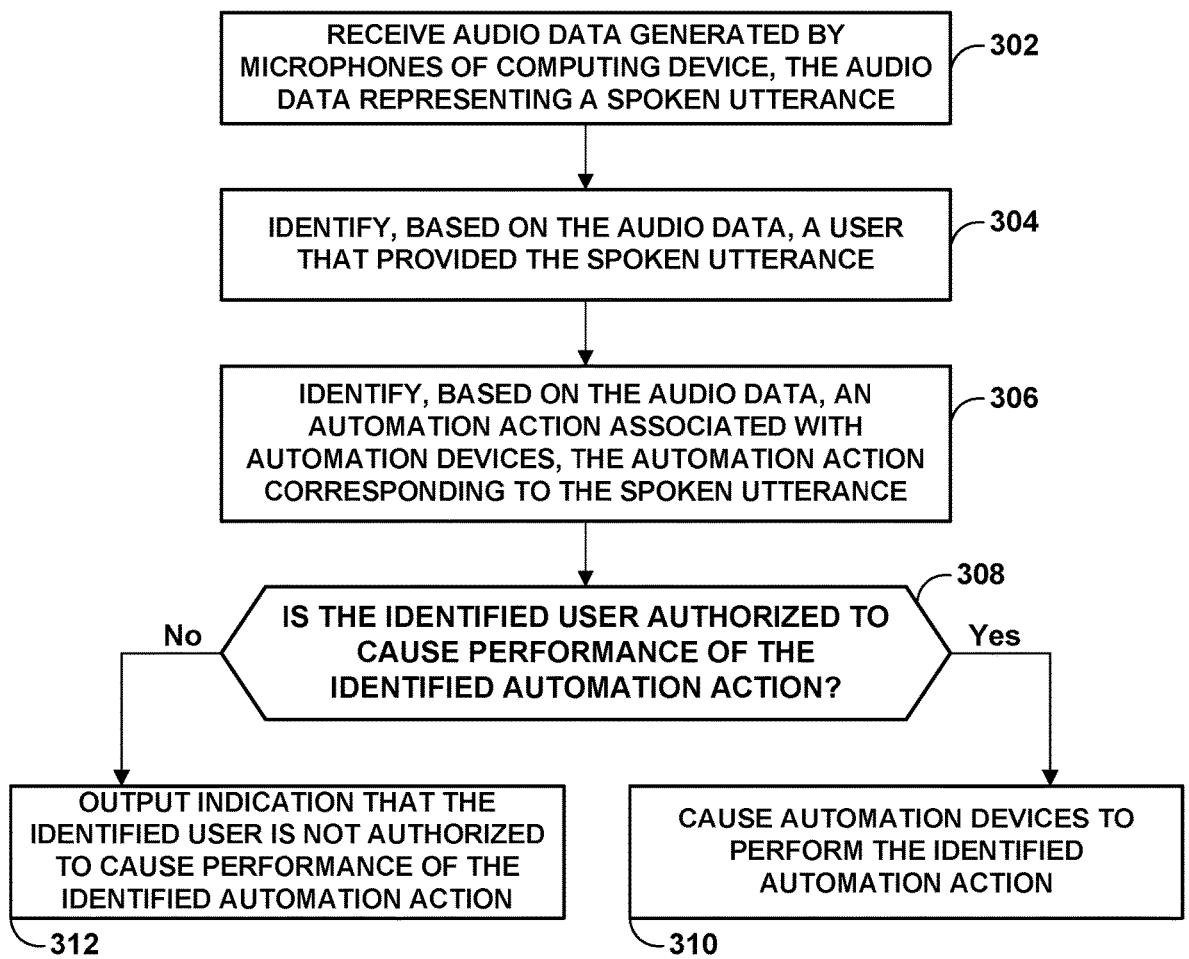
FIG. 3 is a flowchart illustrating example operations performed by one or more processors executing an example virtual assistant, in accordance with one or more aspects of the present disclosure.

FIG. 3 is a flowchart illustrating example operations performed by one or more processors executing an example virtual assistant, in accordance with one or more aspects of the present disclosure. FIG. 3 is described below in the context of system 100 of FIG. 1. For example, local assistant module 122A while executing at one or more processors of computing device 110 may perform one or more of operations 302-312, in accordance with one or more aspects of the present disclosure. And in some examples, remote assistant module 122B while executing at one or more processors of digital assistant system 160 may perform operations 302-312, in accordance with one or more aspects of the present disclosure. For purposes of illustration only, FIG. 3 is described below within the context of computing device 110 of FIG. 1.

In operation, computing device 110 may receive audio data generated by one or more microphones of computing device 110, the audio data representing a spoken utterance (302). For instance, in response to recognizing a spoken trigger phrase, computing device 110 may receive audio data representing a verbal utterance provided by a user computing device 110.

Computing device 110 may identify, based on the audio data, a user that provided the spoken utterance (304). As discussed above, computing device 110 may identify the user that provided the spoken utterance (i.e., the requesting user) based on one or both of the trigger phrase and a comparison of the audio data with voice prints of users configured to use computing device 110.

In some examples, computing device 110 may perform all of operations 302-312. However, for this example, operations 302 and 304 may be performed by one or both computing device 110 and digital assistant system 160, and digital assistant system 160 may further perform operations 306-312. For instance, computing device 110 may output, via network 130 and to digital assistant system 160, the audio data representing the spoken utterance and an indication of the identified user. As such, digital assistant system 160 may receive the audio data generated by one or more microphones of computing device 110 and identify, based on the audio data, the user that provided the spoken utterance by receiving, from computing device 110, the audio data and the indication of the identified user.

Digital assistant system 160 may identify, based on the received audio data, an automation action associated with one or more automation devices, the automation action corresponding to the spoken utterance (306). For instance, as discussed above, digital assistant system 160 may determine, based on the audio data, a plurality of automation action candidates, determine a score for each respective automation action candidate that indicates a likelihood that the respective automation action candidate corresponds to the spoken utterance, and select an automation action candidate of the plurality of automation action candidates with the score indicating the highest likelihood of corresponding to the spoken utterance as the identified automation action.

As discussed in further detail below, in some examples, digital assistant system 160 may identify the automation based on one or more preferences of the identified user. For example, a profile of a first user registered with computing device 110 may indicate that the first user prefers the utterance "turn on the light" to correspond to an automation action of turning on a first light, and a profile of a second user registered with computing device 110 may indicate that the first user prefers the utterance "turn on the light" to correspond to an automation action of turning on a second light. As such, digital assistant system 160 may identify different automations for identical utterances that are provided by different users to the same computing device (e.g., should profiles for the different users indicate different preferences).

Digital assistant system 160 may determine whether the identified user is authorized to cause performance of the identified automation action (308). For instance, digital assistant system 160 may determine whether the identified user is authorized to cause performance of the identified automation action based on permission settings stored in user information data store 124B.

Responsive to determining that the identified user is authorized to cause performance of the identified automation action ("Yes" branch of 308), digital assistant system 160 may cause the one or more automation devices to perform the identified automation action (310). For instance, digital assistant system 160 may output, to the one or more automation devices associated with the identified automation action, a message requesting performance of the identified automation action.

Responsive to determining that the identified user is not authorized to cause performance of the identified automation action ("No" branch of 308), digital assistant system 160 may cause computing device 110 to output an indication that the identified user is not authorized to cause performance of the identified automation action (312). For instance, digital assistant system 160 may output a message to computing device 110, the message requesting that UID 112 of computing device 110 output audio data with a synthesized voice saying that the identified user is not authorized to cause performance of the identified automation action (e.g., "I'm sorry, you do not appear to be authorized to unlock the front door"). In this way, the techniques of this disclosure may facilitate performance of automation actions to satisfy verbal or spoken requests of users of computing device 110 while also improving the security of system 100.

Figure 4:
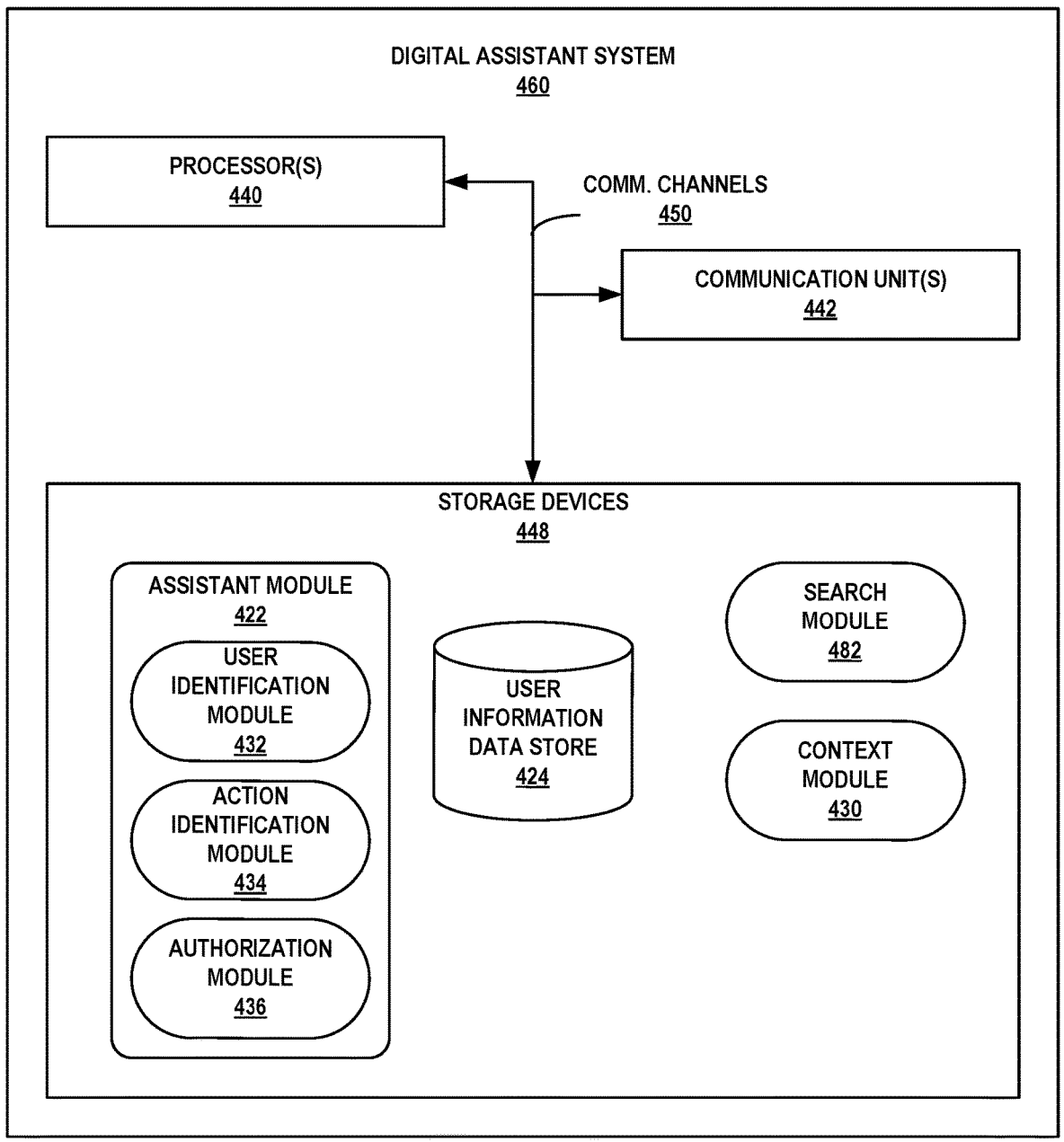
FIG. 4 is a block diagram illustrating an example computing device that is configured to execute an example virtual assistant, in accordance with one or more aspects of the present disclosure.

FIG. 4 is a block diagram illustrating an example computing system that is configured to execute an example virtual assistant, in accordance with one or more aspects of the present disclosure. Assistant server system 460 of FIG. 4 is described below as an example of digital assistant system 160 of FIG. 1. FIG. 4 illustrates only one particular example of assistant server system 460, and many other examples of assistant server system 460 may be used in other instances and may include a subset of the components included in example assistant server system 460 or may include additional components not shown in FIG. 4.

As shown in the example of FIG. 4, assistant server system 460 includes user one or more processors 440, one or more communication units 442, and one or more storage components 448. Storage components 448 include assistant module 422, search module 482, context module 430, and user information data store 424.

Processors 440 are analogous to processors 240 of computing system 210 of FIG. 2. Communication units 442 are analogous to communication units 242 of computing system 210 of FIG. 2. Storage devices 448 are analogous to storage devices 248 of computing system 210 of FIG. 2. Communication channels 450 are analogous to communication channels 250 of computing system 210 of FIG. 2 and may therefore interconnect each of the components 440, 442, and 448 for inter-component communications. In some examples, communication channels 450 may include a system bus, a network connection, an inter-process communication data structure, or any other method for communicating data.

Search module 482 of assistant server system 460 is analogous to search module 282 of computing device 210 and may perform integrated search functions on behalf of assistant server system 460. That is, search module 482 may perform search operations on behalf of assistant module 422. In some examples, search module 482 may interface with external search systems, such as search server system 180 to perform search operations on behalf of assistant module 422. When invoked, search module 482 may perform search functions, such as generating search queries and executing searches based on generated search queries across various local and remote information sources. Search module 482 may provide results of executed searches to the invoking component or module. That is, search module 482 may output search results to assistant module 422.

Context module 430 of assistant server system 460 is analogous to context module 230 of computing device 210. Context module 430 may collect contextual information associated with computing devices, such as computing device 110 of FIG. 1 and computing device 210 of FIG. 2, to define a context of the computing device. Context module 430 may primarily be used by assistant module 422 and/or search module 482 to define a context of a computing device interfacing and accessing a service provided by digital assistant system 160. The context may specify the characteristics of the physical and/or virtual environment of the computing device and a user of the computing device at a particular time.

Assistant module 422 may include all functionality of local assistant module 122A and remote assistant module 122B of FIG. 1, as well as assistant module 222 of computing device 210 of FIG. 2. Assistant module 422 may perform similar operations as remote assistant module 122B for providing an assistant service that is accessible via assistant server system 460. That is, assistant module 422 may act as an interface to a remote assistant service accessible to a computing device that is communicating over a network with assistant server system 460. For example, assistant module 422 may be an interface or API to remote assistant module 122B of digital assistant system 160 of FIG. 1.

User identification module 432, action identification module 434, and authorization module 436 may include all functionality of user identification module 232, action identification module 234, and authorization module 236 of FIG. 2. That is, user identification module 432 may be executable by processors 440 to identify a user that provided a spoken utterance based on audio data representing the spoken utterance, action identification module 434 may be executable by processors 440 to identify an automation action associated with one or more automation devices that corresponds to the spoken utterance, and authorization module 436 may be executable by processors 440 to determine whether the identified user is authorized to cause performance of the identified automation action.

User information data store 424 is analogous to user information data store 224 of FIG. 2 and is configured to store personal records created by assistant module 422 that includes information that assistant module 422 has learned about the user of a computing device during conversations between the user and an assistant provided by assistant module 422. Assistant module 422 may rely on the information stored at data store 424, in addition to any information provided by context module 430 and/or search module 482, to perform assistant tasks.

For example, the following represents various scenarios between a user of computing device 110 of FIG. 1 and an assistant provided by assistant module 422. For each scenario, there is some initial exchange of information between the user and the assistant, and one or more examples are provided indicating how this will impact the user's experience.

Figure 5:
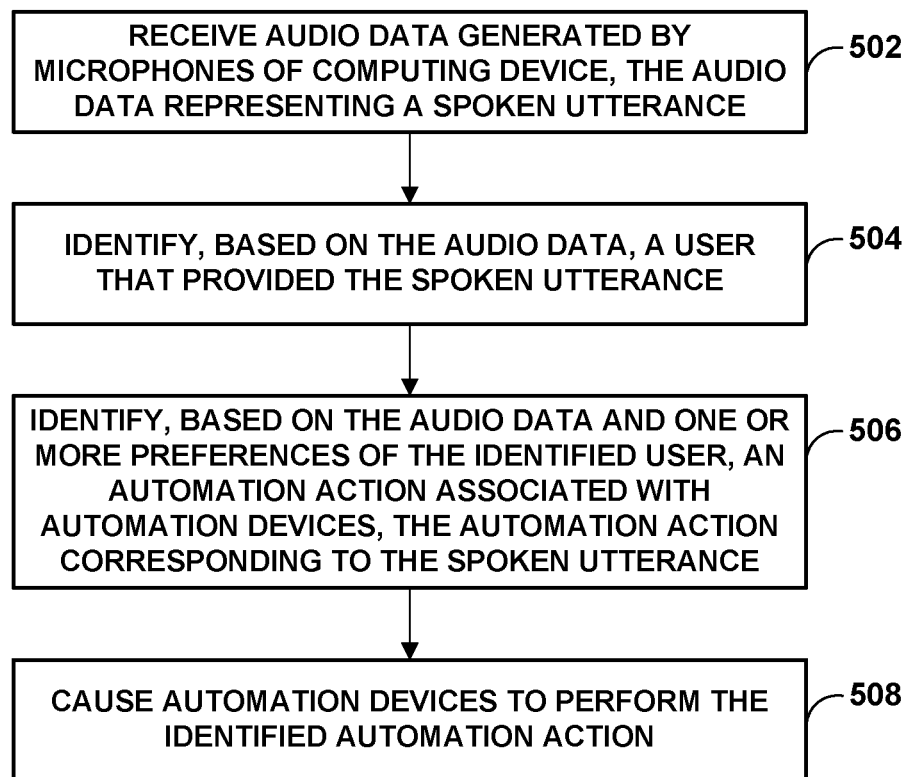
FIG. 5 is a flowchart illustrating example operations performed by one or more processors executing an example virtual assistant, in accordance with one or more aspects of the present disclosure.

FIG. 5 is a flowchart illustrating example operations performed by one or more processors executing an example virtual assistant, in accordance with one or more aspects of the present disclosure. FIG. 5 is described below in the context of system 100 of FIG. 1. For example, local assistant module 122A while executing at one or more processors of computing device 110 may perform one or more of operations 502-508, in accordance with one or more aspects of the present disclosure. And in some examples, remote assistant module 122B while executing at one or more processors of digital assistant system 160 may perform operations 502-508, in accordance with one or more aspects of the present disclosure. For purposes of illustration only, FIG. 5 is described below within the context of computing device 110 of FIG. 1.

In operation, computing device 110 may receive audio data generated by one or more microphones of computing device 110, the audio data representing a spoken utterance (502). For instance, in response to recognizing a spoken trigger phrase, computing device 110 may receive audio data representing a verbal utterance provided by a user computing device 110.

Computing device 110 may identify, based on the audio data, a user that provided the spoken utterance (504). As discussed above, computing device 110 may identify the user that provided the spoken utterance (i.e., the requesting user) based on one or both of the trigger phrase and a comparison of the audio data with voice prints of users configured to use computing device 110.

In some examples, computing device 110 may perform all of operations 502-508. However, for this example, operations 502 and 504 may be performed by one or both computing device 110 and digital assistant system 160, and digital assistant system 160 may further perform operations 506 and 508. For instance, computing device 110 may output, via network 130 and to digital assistant system 160, the audio data representing the spoken utterance and an indication of the identified user. As such, digital assistant system 160 may receive the audio data generated by one or more microphones of computing device 110 and identify, based on the audio data, the user that provided the spoken utterance by receiving, from computing device 110, the audio data and the indication of the identified user.

Digital assistant system 160 may identify, based on the received audio data, an automation action associated with one or more automation devices, the automation action corresponding to the spoken utterance (506). For instance, as discussed above, digital assistant system 160 may determine, based on the audio data, a plurality of automation action candidates, determine a score for each respective automation action candidate that indicates a likelihood that the respective automation action candidate corresponds to the spoken utterance, and select an automation action candidate of the plurality of automation action candidates with the score indicating the highest likelihood of corresponding to the spoken utterance as the identified automation action.

As discussed in further detail below, in some examples, digital assistant system 160 may identify the automation based on one or more preferences of the identified user. For instance, digital assistant system 160 may adjust the scores of the automation action candidates that correspond to automations actions that are preferred by the identified user (i.e., the user that provided the spoken utterance). To illustrate, where the utterance is "turn on the light," digital assistant system 160 may determine automation action candidates and scores shown below in Table 4.

TABLE 4

| Automation Action Candidate | Score |
| --- | --- |
| Turn on light action performed by a living room light | 80 |
| Turn on light action performed by a light in User A's bedroom | 80 |
| Turn on light action performed by a light in User B's bedroom | 80 |

As can be seen in Table 4, each of the candidates may initially have the same score. As stated above, digital assistant system 160 may adjust the scores based on preferences of the identified user. For instance, if User A is identified as the user that provided the utterance "turn on the light" and a profile associated with User A indicates a preference for the light in User A's bedroom being associated with the utterance "turn on the light," digital assistant system 160 may adjust the scores as shown below in Table 5, where the score for the "Turn on light action performed by a light in User A's bedroom" automation action candidate has been increased.

TABLE 5

| Automation Action Candidate | Score |
|---|---|
| Turn on light action performed by a living room light | 80 |
| Turn on light action performed by a light in User A's bedroom | 90 |
| Turn on light action performed by a light in User B's bedroom | 80 |

Digital assistant system 160 may select the automation action candidate of the plurality of automation action candidates with the score indicating the highest likelihood of corresponding to the spoken utterance (e.g., automation action candidate with the highest score) as the identified automation action. In the example above, digital assistant system 160 may select the "Turn on light action performed by a light in User A's bedroom" automation action candidate as the identified automation action.

In other instances, digital assistant system 160 may select other automation action candidates based on an identical utterance. For instance, if User B is identified as the user that provided the utterance "turn on the light" and a profile associated with User B indicates a preference for the light in User B's bedroom being associated with the utterance "turn on the light," digital assistant system 160 may increase the score of the "Turn on light action performed by a light in User B's bedroom" automation action candidate, and select the "Turn on light action performed by a light in User B's bedroom" automation action candidate as the identified automation action. As such, digital assistant system 160 may bias the selection of automation actions based on user preferences such that identical utterances provided by different users result in different identified automation actions.

Digital assistant system 160 may cause the automation devices associated with the identified automation action to perform the identified automation action (508). For instance, digital assistant system 160 may output, to the one or more automation devices associated with the identified automation action, a message requesting performance of the identified automation action.

In some examples, prior to causing the automation devices associated with the identified automation action to perform the identified automation action, digital assistant system 160 may determine whether the identified user is authorized to cause performance of the identified automation action. For instance, digital assistant system 160 may determine whether the identified user is authorized to cause performance of the identified automation action as discussed above with reference to FIG. 3. It should be noted that just because a user has a preference for a particular automation action does not necessarily mean that the user automatically is authorized to initiate performance of the particular automation action.

The following numbered examples may illustrate one or more aspects of the disclosure:

Example 1

A method comprising: receiving audio data generated by one or more microphones of a computing device, the audio data representing a spoken utterance; identifying, based on the audio data, a user that provided the spoken utterance; identifying, by one or more processors and based on the audio data, an automation action associated with one or more automation devices, the automation action corresponding to the spoken utterance; determining, by the one or more processors, whether the identified user is authorized to cause performance of the identified automation action; and responsive to determining that the identified user is authorized to cause performance of the identified automation action, causing, by the one or more processors, the one or more automation devices to perform the identified automation action.

Example 2

The method of example 1, wherein determining whether the identified user is authorized to cause performance of the identified automation action comprises: determining whether the identified user is authorized to utilize the one or more automation devices associated with the identified automation action; and responsive to determining that the identified user is authorized to utilize the one or more automation devices associated with the identified automation action, determining that the identified user is authorized to cause performance of the identified automation action.

Example 3

The method of any combination of examples 1-2, wherein identifying the user that provided the spoken utterance comprises: determining whether the spoken utterance was provided by one of a plurality of users registered with the computing device; and responsive to determining that the spoken utterance was not provided by one of the plurality of users registered with the computing device, identifying the user that provided the spoken utterance as a guest user that is not registered with the computing device.

Example 4

The method of example 3, wherein determining whether the identified user is authorized to cause performance of the identified automation action comprises: determining that guest users are authorized to cause performance of the identified automation action.

Example 5

The method of any combination of examples 1-4, wherein the one or more processors are included in a computing system that is different than the computing device, and wherein receiving the audio data and identifying the user comprises: receiving, by the one or more processors of the computing system and from the computing device, the audio data and an indication of the identified user, wherein causing the one or more automation devices to perform the identified automation action comprises: outputting, by the one or more processors of the computing system and to the one or more automation devices, a message requesting performance of the identified automation action.

Example 6

The method of example 5, wherein the message does not include an indication of the identified user.

Example 7

The method of any combination of examples 1-6, wherein the one or more processors are included in at least one of the computing device or one or more other computing devices.

Example 8

The method of any combination of examples 1-7, wherein identifying the automation action comprises: determining, based on the audio data, a plurality of automation action candidates; determining, for each respective automation action candidate of the automation action candidates, a score that indicates a likelihood that the respective automation action candidate corresponds to the spoken utterance; and selecting an automation action candidate of the plurality of automation action candidates with the score indicating the highest likelihood of corresponding to the spoken utterance as the identified automation action.

Example 9

The method of example 8, further comprising: adjusting the scores of the automation action candidates that correspond to automation actions of-which the identified user is authorized to cause performance relative to the scores of the automation action candidates that correspond to automation actions of-which the identified user is not authorized to cause performance.

Example 10

The method of any combination of examples 1-9, wherein the audio data is second audio data, the method further comprising: receiving the audio data based on a trigger phrase being recognized by the computing device from first audio data generated by the one or more microphones, wherein each user of a plurality of users registered with the computing device is associated with a respective trigger phrase, wherein a trigger phrase associated with a first user of the plurality of users is different than a trigger phrase associated with a second user of the plurality of users, and wherein identifying the user the provided the spoken utterance comprises: identifying the user that provided the spoken utterance based at least in part on the trigger phrase recognized by the computing device.

Example 11

A computing system comprising: a communications module; at least one processor; and at least one memory comprising instructions that when executed, cause the at least one processor to provide an assistant configured to: receive, via the communications module, audio data generated by one or more microphones of a computing device, the audio data representing a spoken utterance; obtain an identification of a user that provided the spoken utterance, the identification determined based on the audio data; identify, based on the audio data, an automation action associated with one or more automation devices, the automation action corresponding to the spoken utterance; determine whether the identified user is authorized to cause performance of the identified automation action; and in response to determining that the identified user is authorized to cause performance of the identified automation action, cause the one or more automation devices to perform the identified automation action.

Example 12

The computing system of example 11, wherein, to determine whether the identified user is authorized to cause performance of the identified automation action, the assistant is configured to: determine whether the identified user is authorized to utilize the one or more automation devices associated with the identified automation action; and responsive to determining that the identified user is authorized to utilize the one or more automation devices associated with the identified automation action, determine that the identified user is authorized to cause performance of the identified automation action.

Example 13

The computing system of any combination of examples 11-12, wherein, to identify the user that provided the spoken utterance, the assistant is configured to: determine whether the spoken utterance was provided by one of a plurality of users registered with the computing device; and responsive to determining that the spoken utterance was not provided by one of the plurality of users registered with the computing device, identify the user that provided the spoken utterance as a guest user that is not registered with the computing device.

Example 14

The computing system of example 13, wherein, to determine whether the identified user is authorized to cause performance of the identified automation action, the assistant is configured to: determine that guest users are authorized to cause performance of the identified automation action.

Example 15

The computing system of any combination of examples 11-14, wherein, to identify the automation action, the assistant is configured to: determine, based on the audio data, a plurality of automation action candidates; determine, for each respective automation action candidate of the automation action candidates, a score that indicates a likelihood that the respective automation action candidate corresponds to the spoken utterance; and select an automation action candidate of the plurality of automation action candidates with the score indicating the highest likelihood of corresponding to the spoken utterance as the identified automation action.

Example 16

The computing system of example 15, wherein the assistant is further configured to: adjust the scores of the automation action candidates that correspond to automation actions of-which the identified user is authorized to cause performance relative to the scores of the automation action candidates that correspond to automation actions of-which the identified user is not authorized to cause performance.

Example 17

The computing system of any combination of examples 11-16, wherein the audio data is second audio data, and wherein the assistant is further configured to: receive the audio data based on a trigger phrase being recognized by the computing device from first audio data generated by the one or more microphones, wherein each user of a plurality of users registered with the computing device is associated with a respective trigger phrase, wherein a trigger phrase associated with a first user of the plurality of users is different than a trigger phrase associated with a second user of the plurality of users, and wherein identifying the user the provided the spoken utterance comprises: identify the user that provided the spoken utterance based at least in part on the trigger phrase recognized by the computing device.

Example 19

A computing system comprising: a communications module; at least one processor; and at least one memory comprising instructions that when executed, cause the at least one processor to provide an assistant configured to: receive, via the communications module, audio data generated by one or more microphones of a computing device, the audio data representing a spoken utterance; obtain an identification of a user that provided the spoken utterance, the identification determined based on the audio data; identify, based on the audio data and one or more preferences of the identified user, an automation action associated with one or more automation devices, the automation action corresponding to the spoken utterance; and cause the one or more automation devices to perform the identified automation action.

Example 20

The computing system of example 19, wherein: to receive the audio data, the assistant is configured to receive first audio data generated by the one or more microphones of the computing device, the first audio data representing a spoken utterance provided by a first user; the assistant is further configured to receive second audio data generated by the one or more microphones of the computing device, the second audio data representing a spoken utterance provided by a second user, the second spoken utterance being the same as the first spoken utterance; to identify an automation action based on the first audio data, the assistant is configured to identify a first automation action based on the first audio data and one or more preferences of the first user; and to identify an automation action based on the second audio data, the assistant is configured to identify a second automation action based on the second audio data and one or more preferences of the second user, the second automation action being different than the first automation action.

Example 21

A method comprising: receiving first audio data generated by one or more microphones of a computing device, the first audio data representing a spoken utterance; determining that a first user provided the spoken utterance represented by the first audio data; identifying, based on the first audio data and one or more preferences of the first user, a first automation action corresponding to the spoken utterance; initiating performance of the first automation action; receiving second audio data generated by the one or more microphones of the computing device, the second audio data representing the same spoken utterance; determining that a second user provided the spoken utterance represented by the second audio data, the second spoken utterance being the same as the first spoken utterance; identifying, based on the second audio data and one or more preferences of the second user, a second automation action corresponding to the spoken utterance, the second automation action being different than the first automation action; and initiating performance of the second automation action.

Example 22

A computer-readable storage medium storing instructions that, when executed, cause one or more processors of a computing system and/or a computing device to perform the method of any combination of examples 1-10 and 21.

Example 23

A system comprising means for performing the method of any combination of examples 1-10 and 21.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable medium may include computer-readable storage media or mediums, which corresponds to a tangible medium such as data storage media, or communication media including any medium that facilitates transfer of a computer program from one place to another, e.g., according to a communication protocol. In this manner, computer-readable medium generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments have been described. These and other embodiments are within the scope of the following claims.

What is claimed is:

1. A method implemented by one or more processors, the method comprising:
   receiving audio data generated by one or more microphones of a computing device, the audio data representing a spoken utterance;
   identifying, based on the audio data, that a guest user provided the spoken utterance;
   identifying, based on the audio data, a particular automation action for a particular automation device, the particular automation action corresponding to the spoken utterance;
   determining that the guest user is not authorized to cause performance of the particular automation action for the particular automation device;
   refraining from initiating performance of the particular automation action responsive to determining that the guest user is not authorized to cause performance of the particular automation action for the particular automation device;
   receiving additional audio data generated by the one or more microphones of the computing device, the additional audio data representing an additional spoken utterance;
   identifying, based on the additional audio data, that the guest user provided the additional spoken utterance;
   identifying, based on the additional audio data, an additional automation action for the particular automation device, the additional automation action corresponding to the additional spoken utterance;
   determining that the guest user is authorized to cause performance of the additional automation action for the particular automation device; and
   responsive to determining that the guest user is authorized to cause performance of the additional automation action for the particular automation device:
      causing the particular automation device to perform the additional automation action.

2. The method of claim 1, wherein identifying that the guest user provided the spoken utterance comprises:
   determining whether the spoken utterance was provided by any one of one or more users registered with the computing device; and
   responsive to determining that the spoken utterance was not provided by any one of the one or more users registered with the computing device, identifying the user that provided the spoken utterance as the guest user.

3. The method of claim 2, wherein determining whether the spoken utterance was provided by any one of the one or more users registered with the computing device comprises determining whether the audio data matches a voice print of a given one of the one or more users registered with the computing device.

4. The method of claim 3, wherein the audio data further comprises a representation of a trigger phrase that precedes the spoken utterance.

5. The method of claim 1, wherein the particular automation device is a thermostat.

6. The method of claim 5, wherein the additional automation action is a temperature adjustment action.

7. The method of claim 6, wherein the particular automation action is a humidity adjustment action.

8. The method of claim 6, wherein the particular automation action is a fan deactivation action.

9. A computing system, comprising:
   a communications module;
   at least one processor; and
   at least one memory comprising instructions that when executed, cause the at least one processor to provide an assistant configured to:
      receive, via the communications module, audio data generated by one or more microphones of a computing device, the audio data representing a spoken utterance;
      obtain an indication that a guest user provided the spoken utterance;
      identify, based on the audio data, a particular automation action for a particular automation device, the particular automation action corresponding to the spoken utterance;
      refrain from initiating performance of the particular automation action responsive to determining that the guest user is not authorized to cause performance of the particular automation action for the particular automation device;
      receive additional audio data generated by the one or more microphones of the computing device, the additional audio data representing an additional spoken utterance;
      obtain an additional indication that the guest user provided the additional spoken utterance;
      identify, based on the additional audio data, an additional automation action for the particular automation device, the additional automation action corresponding to the additional spoken utterance;
      determine that the guest user is authorized to cause performance of the additional automation action for the particular automation device; and responsive to determining that the guest user is authorized to cause performance of the additional automation action for the particular automation device:
cause the particular automation device to perform the additional automation action.

10. The system of claim 9, wherein the indication that the guest user provided the spoken utterance is determined based on the audio data, and wherein the indication that the guest user provided the additional spoken utterance is based on the additional audio data.

11. The system of claim 10, wherein the audio data further comprises a representation of a trigger phrase that precedes the spoken utterance.

12. The system of claim 9, wherein the particular automation device is a thermostat.

13. The system, of claim 12, wherein the additional automation action is a temperature adjustment action.

14. The system of claim 13, wherein the particular automation action is a humidity adjustment action.

15. The system of claim 13, wherein the particular automation action is a fan deactivation action.

16. The system of claim 9, wherein the indication that the guest user provided the spoken utterance is determined based on comparing the audio data to one or more voice prints of one or more registered users.

17. At least one non-transitory computer-readable storage medium comprising instructions that, when executed, cause at least one computing device to:
receive audio data generated by one or more microphones, the audio data representing a spoken utterance;
identify, based on the audio data, that a guest user provided the spoken utterance;
identify, based on the audio data, a particular automation action for a particular automation device, the particular automation action corresponding to the spoken utterance;
determine that the guest user is not authorized to cause performance of the particular automation action for the particular automation device;
refrain from initiating performance of the particular automation action responsive to determining that the guest user is not authorized to cause performance of the particular automation action for the particular automation device;
receive additional audio data generated by the one or more microphones, the additional audio data representing an additional spoken utterance;
identify, based on the additional audio data, that the guest user provided the additional spoken utterance;
identify, based on the additional audio data, an additional automation action for the particular automation device, the additional automation action corresponding to the additional spoken utterance;
determine that the guest user is authorized to cause performance of the additional automation action for the particular automation device; and
responsive to determining that the guest user is authorized to cause performance of the additional automation action for the particular automation device:
cause the particular automation device to perform the additional automation action.

18. The non-transitory computer-readable storage medium of claim 17, wherein the particular automation device is a door lock.

19. The non-transitory computer-readable storage medium of claim 17, wherein the additional automation action is a lock action.

20. The non-transitory computer-readable storage medium of claim 19, wherein the particular automation action is an unlock action.

* * * * *